Patented Nov. 12, 1940

2,221,035

UNITED STATES PATENT OFFICE 2,221,035

POLYVINYL ACETAL RESIN SHEETS CONTAINING A DIALKYL MALEATE

Donald R. Swan, Rochester, N. Y., assignor to Eastman Kodak Company, Rochester, N. Y., a corporation of New Jersey No Drawing. Application December 14, 1939, Serial No. 309,236

4 Claims. (Cl. 260—36)

This invention relates to polyvinyl acetal resin sheets, and more particularly to sheets suitable for the manufacture of safety glass.

One object of my invention is to produce compositions of matter which can be made into permanently transparent sheets suitable for use in laminated, shatter-proof glass. Another object is to produce compositions which can be rolled, extruded, molded, or otherwise worked into relatively thick sheets and massive plastics. Other objects will hereinafter appear.

I have discovered that the dialkyl maleates in which each alkyl group contains from 6 to 8 carbon atoms, namely, di-hexyl, di-heptyl, di-octyl, hexyl-heptyl, hexyl-octyl, and heptyl-octyl maleates, are useful plasticizers for certain poly-vinyl acetal resins, namely the polyvinyl butyraldehyde acetal resins. Moreover, I have discovered that when 40 or more parts of any of the dialkyl maleates is used with 100 parts of polyvinyl butyraldehyde acetal resin, an unusual and remarkable effect is obtained which I may call "elasticizing." That is to say, a sheet of polyvinyl butyraldehyde acetal resin containing about 40 or more parts of any of these dialkyl maleates per 100 parts of resin possesses the property which, in the rubber industry, is known as "nerve": namely, the property of stretching to a considerable extent when tension is exerted upon it, and returning to its original dimensions when the tension is released. This property renders such sheets, which I shall call "rubbery" sheets, particularly useful in the manufacture of shatter-proof glass. Mixtures of any of these dialkyl maleates may, of course, be used.

Sheets for use in laminated glass may be made by dissolving the polyvinyl butyraldehyde acetal resin and the dialkyl maleate in a suitable volatile solvent or solvent mixture, such, for instance, as acetone, methanol, acetone-methanol mixtures, ethylene chloride-methanol mixtures, etc., about 300 to 500 or more parts of the solvent or solvent mixture being used per 100 parts of the resin. The solution is then cast as a sheet, the volatile solvent evaporated, and the sheet stripped from the casting surface.

Sheets for use in laminated glass may also be made without the use of volatile solvent by extrusion, for example, in the manner set forth in application Serial No. 147,934 of John S. Kimble and Ernest C. Blackard, filed June 12, 1937. For example, 40 or more parts of the dialkyl maleate and 100 parts of a poly-vinyl butyraldehyde acetal resin may be mixed in a suitable, jacketed mixer at a low temperature, for example 10° C., and the mixture may then be worked on hot rolls, in the manner described in U. S. Patent 2,048,686 of F. R. Conklin, until complete homogenization has taken place. The mass thus produced may then be extruded through an annular die, and the tube so formed slit to form a sheet.

The polyvinyl acetal resins can be prepared by reacting polyvinyl alcohol with an aldehyde in the presence of an acetal condensation catalyst, e. g. a mineral acid. These resins can also be prepared by simultaneously de-esterifying a polyvinyl aliphatic ester and reacting the de-esterification product with an aldehyde in the presence of a de-esterifying-catalyst and acetal condensation catalyst. Mineral acids are catalysts for both de-esterification and acetal formation.

Examples of the preparation of polyvinyl butyraldehyde acetal resins may be found in U. S. Patent 2,044,730, Examples 2, 5 and 6; British Patent 466,598, Example 5; French Patent 813,303, Example 1; French Patent 813,514, Examples 1, 2, 3, and 4; and British Patent 459,878, Examples 1, 2, 5, 6, 7, 8, 9 and 10.

What I claim as my invention and desire to be secured by Letters Patent of the United States is:

1. A transparent, rubbery sheet comprising 100 parts of a polyvinyl butyraldehyde acetal resin and at least 40 parts, approximately, of a dialkyl maleate in which each alkyl group contains from 6 to 8 carbon atoms.

2. A transparent, rubbery sheet comprising 100 parts of a polyvinyl butyraldehyde acetal resin and at least 40 parts, approximately, of di-hexyl maleate.

3. A transparent, rubbery sheet comprising 100 parts of a polyvinyl butyraldehyde acetal resin and at least 40 parts, approximately, of di-heptyl maleate.

4. A transparent, rubbery sheet comprising 100 parts of a polyvinyl butyraldehyde acetal resin and at least 40 parts, approximately, of di-octyl maleate.

DONALD R. SWAN.